United States Patent
Ning et al.

(10) Patent No.: US 11,705,288 B1
(45) Date of Patent: Jul. 18, 2023

(54) POLYMER CAPACITORS THAT MITIGATE ANOMALOUS CHARGING CURRENT

(71) Applicant: Apple Inc., Cupertino, CA (US)

(72) Inventors: Gang Ning, San Jose, CA (US); Jiaqing Xi, Shanghai (CN); Felix Ren, Shanghai (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/572,053

(22) Filed: Jan. 10, 2022

(51) Int. Cl.
 *H01G 9/07* (2006.01)
 *H01G 9/042* (2006.01)
 *H01G 9/15* (2006.01)

(52) U.S. Cl.
 CPC ............. *H01G 9/07* (2013.01); *H01G 9/0425* (2013.01); *H01G 9/15* (2013.01)

(58) Field of Classification Search
 CPC .................................. H01G 9/07; H01G 9/15
 See application file for complete search history.

(56) References Cited

U.S. PATENT DOCUMENTS

| | | | | |
|---|---|---|---|---|
| 4,110,815 A | * | 8/1978 | Frade | H01G 9/0032 361/524 |
| 2003/0142465 A1 | * | 7/2003 | Asami | C22C 32/0068 361/508 |
| 2005/0219801 A1 | * | 10/2005 | Yano | H01G 9/15 361/523 |
| 2006/0187618 A1 | * | 8/2006 | Iida | H01G 9/042 361/524 |
| 2007/0146970 A1 | * | 6/2007 | Iida | H01G 9/07 361/523 |
| 2009/0015989 A1 | * | 1/2009 | Takatani | H01G 9/15 29/25.03 |
| 2020/0006011 A1 | * | 1/2020 | Ogawa | H01G 9/0032 |

* cited by examiner

*Primary Examiner* — Eric W Thomas
(74) *Attorney, Agent, or Firm* — Fletcher Yoder, P.C.

(57) ABSTRACT

Many electronic devices may employ electrolytic polymer capacitors in their power supplies for noise filtering, decoupling/bypassing, frequency conversion and DC-DC and AC-DC conversion. However, some polymer capacitors exhibit an anomalous charging current phenomenon, which may prevent proper charging and cause failure in power circuits of the electronic devices. Disclosed herein are polymer capacitors that have a wide band gap material layer between an insulator/dielectric and a polymer cathode, a charge depletion region in the insulator/dielectric, or both, that may mitigate the anomalous charging current.

20 Claims, 13 Drawing Sheets

POLYMER CAPACITORS THAT MITIGATE ANOMALOUS CHARGING CURRENT

BACKGROUND

The present disclosure relates generally to capacitors and, more specifically, to polymer capacitors and anomalous charging current, particularly under fast slew rate of voltage during application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic device, such as a laptop, tablet, or cell phone, may have a power supply which converts current from a charging cable or a battery to a desired voltage and frequency to power various components of the electrical device. The power supply may use one or more polymer capacitors to power on the electrical device and supply power to the electrical device to enable it to function properly. Advantageously, polymer capacitors are compact in size and exhibit high reliability and low equivalent series resistance (ESR), which makes them suitable for consumer electronics. However, in some cases, the polymer capacitors exhibit anomalous charging current, which may result in unpredictable charging or powering of electronic devices, and even causing the electronic devices to fail to power on.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a capacitor has a conductive anode, a dielectric layer deposited on the conductive anode, a wide electronic band gap layer deposited on the dielectric, and a semiconductive cathode disposed on the wide electronic band gap layer.

In another embodiment, a capacitor has a conductive anode, a dielectric layer with a charge depletion region, and a semiconductive cathode deposited on the dielectric layer.

In another embodiment, a capacitor has a conductive anode, a dielectric layer with a charge depletion region, a wide electronic band gap layer deposited on top of the dielectric, and a semiconductive cathode.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
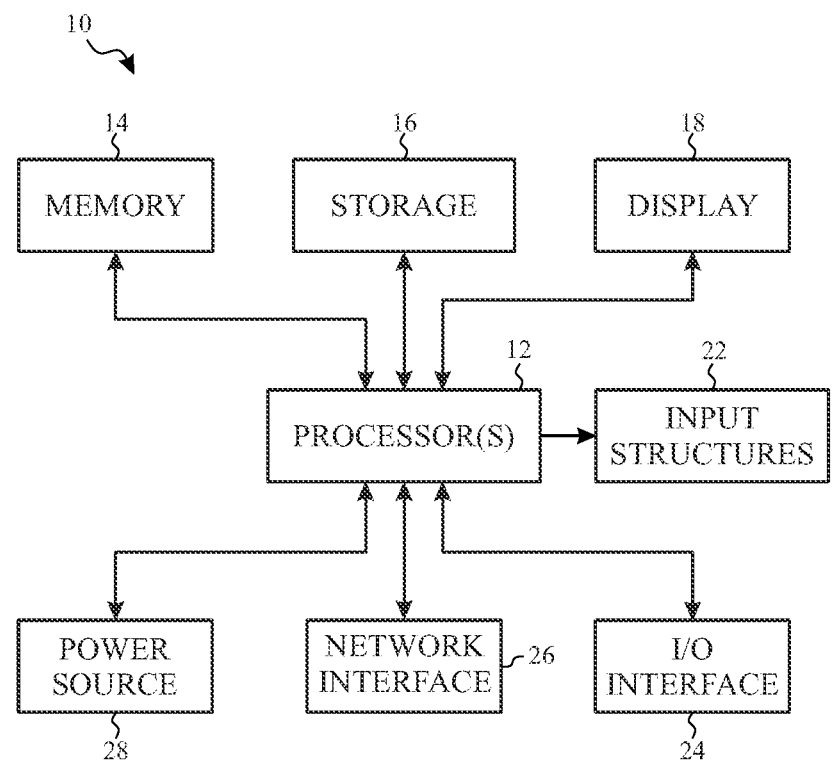
FIG. 1 is a block diagram of an electrical device that having the polymer capacitors described herein, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electronic devices may employ electrolytic polymer capacitors (from now on referred simply as polymer capacitors) in their power supplies for noise filtering, decoupling/bypassing, frequency conversion and direct current to direct current (DC-DC) and alternating current to direct current (AC-DC) conversion. The polymer capacitors have advantageous characteristics such as high capacitance, low equivalent series resistance, volumetric efficiency, stability over long service lifetimes, and long-term reliability under harsh operating conditions. Due to these superior characteristics, polymer capacitors are widely used in consumer electronics as well as high-reliability applications including automotive, defense, and aerospace.

As further discussed below, polymer capacitors may include an anode (e.g., a positively charged plate of the capacitor) made of a conductive material and a cathode (e.g., a negatively changed plate of the capacitor) made of a semiconductive material (material with a conductivity of a semiconductor), separated by an insulator/dielectric layer (e.g., which may be at least partially composed of metal oxide). The conductive (e.g., having a conductivity of an electrical conductor) anode of the polymer capacitor may include a metal, such as tantalum (Ta), niobium (Nb), and/or aluminum (Al), and/or a compound with metallic conductivity, such as niobium monoxide (NbO). The semiconductive (e.g., having a conductivity of a semiconductor) cathode of the polymer capacitor may be at least partially formed by conducting polymers (e.g., polymers that are able to conduct electricity), such as poly (3,4-ethylenedioxythiophene) (PEDOT), poly (3,4-ethylenedioxythiophene) and polystyrene sulfonate (PSS) slurry (PEDOT:PSS), or polypyrrole (PPy). Meanwhile, the insulator/dielectric layer may be at least partially formed by a metal oxide formed from the conductive anode material, such as tantalum pentoxide (Ta$_2$O$_5$), niobium pentoxide (Nb$_2$O$_5$), and/or aluminum(III) oxide (Al$_2$O$_3$).

As mentioned above, in some cases, polymer capacitors may exhibit anomalous charging current phenomenon, resulting in unpredictable charging or powering behavior of electronic devices, and even causing the electronic devices to fail to power on. In an ideal scenario, current in a circuit having a voltage source and a capacitor may be proportional to a rate of change in voltage across the capacitor. However, in some polymer capacitors, the current (e.g., an anomalous, abnormal, or atypical charging current) may exceed the value proportional to the rate of change in voltage, for example, when the voltage change rate is fast (around a few volts per millisecond) and voltage applied has reached a certain threshold value. One consequence of this anomalous charging current is that polymer capacitors may output unpredictable current waveforms. Moreover, some devices may not supply enough power to sustain the high current, which may lead to device malfunction. In some embodiments, the anomalous charging current may be associated with an absence of moisture within the polymer cathode, and may be particularly pronounced in polymer capacitors that were charged immediately after undergoing surface-mounting processes (e.g., mounting onto a surface of a circuit board) without having sufficient time to stabilize.

In some cases, the anomalous charging current in polymer capacitors may be attributed to two types of phenomena: conduction mechanisms at an interface between the insulator/dielectric and the semiconductive cathode of a capacitor, and bulk-limited conduction mechanisms in the insulator/dielectric layer. The conduction mechanisms at the interface may include thermionic emission (e.g., the Schottky effect), field emission, and thermionic-field emission. During thermionic emission, electrons in the semiconductive cathode may obtain enough thermal energy to overcome the energy barrier at the interface and move into the dielectric. During field emission, the interface effects can include quantum phenomena, such as direct and Fowler-Nordheim tunneling of electrons across the insulator/dielectric energy barrier, which may happen if the insulator/dielectric layer is thin. Under the direct tunneling conditions, an electron tunnels through the whole insulator/dielectric energy barrier, whereas under the Fowler-Nordheim conditions, the electron tunnels through a part of the barrier to a conduction band of the insulator. From there, the electron may flow to the conductive anode. During thermionic-field emission, thermally-exited electrons may find their way to the locations where the triangular energy barrier is relatively narrow, thus making tunneling easier. The bulk-limited conduction in the insulator/dielectric layer may arise due to ionic conduction under electric field associated with point lattice defects (e.g., vacancy defects), such as oxygen and metal vacancies, in metal oxide introduced during the formation of the insulator/dielectric layer. In parallel, assisted by the electric field, electrons in the insulator/dielectric may be promoted into the conduction band by thermal excitations. The electrons may move through a crystal in the conduction band for a brief amount of time, before relaxing into an energy "trap." Vacancy defects may act as energy "traps," leading to the conduction of electrons through the bulk of the insulator/dielectric. These phenomena are known as Poole-Frenkel emission and hopping. Any or all of the aforementioned conduction mechanisms may contribute to the anomalous charging current in the polymer capacitors.

While attempts may be made to address the anomalous charging current by in-line testing at the manufacturing site to screen out capacitors with severe anomalous charging current behavior and/or increasing a thickness of the insulator/dielectric layer at the expense of the capacitor's ability to store charge, neither of these approaches have been effective and satisfactory, particularly for mass production.

Embodiments described herein include polymer capacitors that may provide protection from and/or mitigate the anomalous charging current phenomenon. To that end, the polymer capacitors may include a wide band gap material layer between the semiconductive polymer cathode and the insulator/dielectric, and/or a charge depletion region inside the insulator/dielectric introduced through doping impurities. That is, certain embodiments may include polymer capacitors with the wide band gap material layer between the semiconductive polymer cathode and the insulator/dielectric. Additional or alternative embodiments may include polymer capacitors with the charge depletion region inside the insulator/dielectric layer introduced by doping impurities. Further still, certain embodiments may include polymer capacitors with both the wide band gap material layer between and a charge depletion region inside the insulator/dielectric introduced through doping impurity. Such capacitors may, along with appropriate system design, lead to improved reliability of the electronic devices, which may operate in a more fault-tolerant manner.

With the foregoing in mind, a general description of suitable electronic devices that may employ polymer capacitors in their circuitry will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
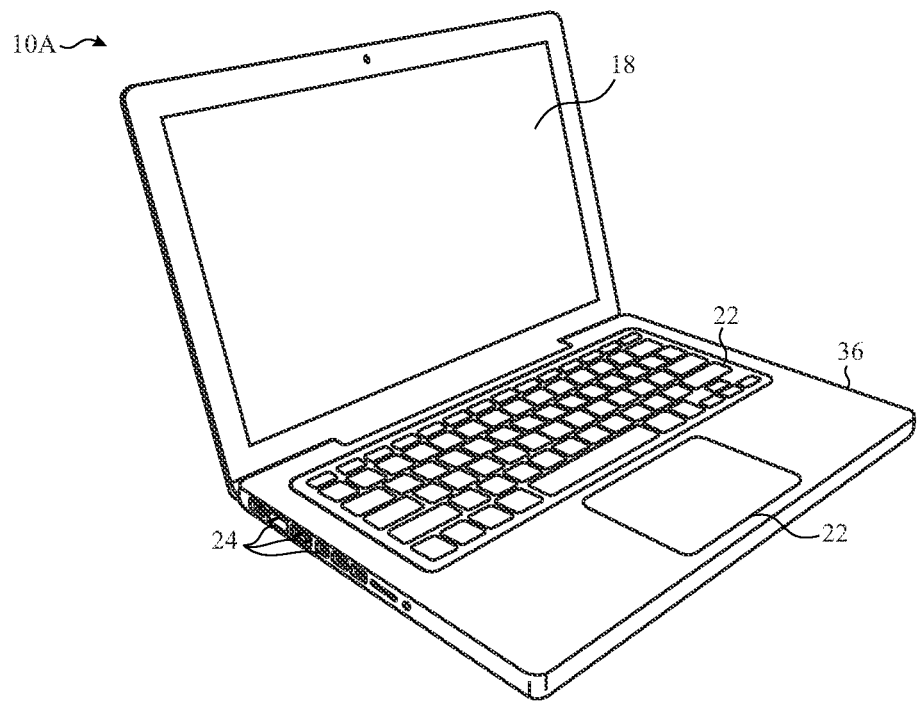
FIG. 2 is a perspective view of a notebook computer employing the polymer capacitors described herein, in accordance with an embodiment of the present disclosure.
Figure 4:
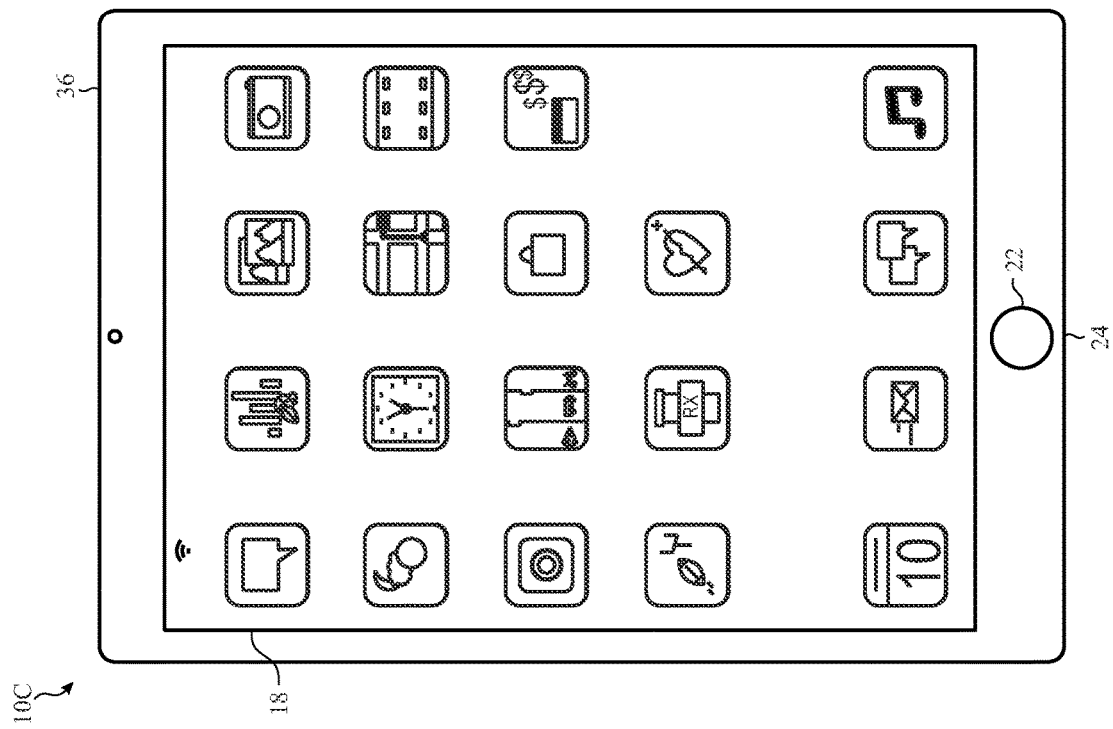
FIG. 4 is a front view of portable tablet computer employing the polymer capacitors described herein, in accordance with an embodiment of the present disclosure.
Figure 3:
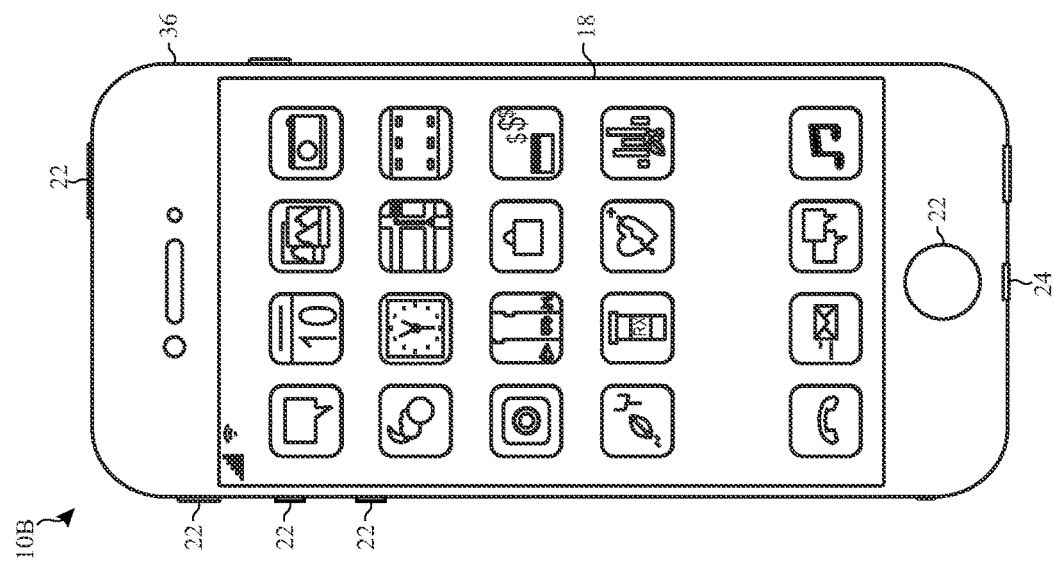
FIG. 3 is a front view of a hand-held device employing the polymer capacitors described herein, in accordance with an embodiment of the present disclosure.
Figure 5:
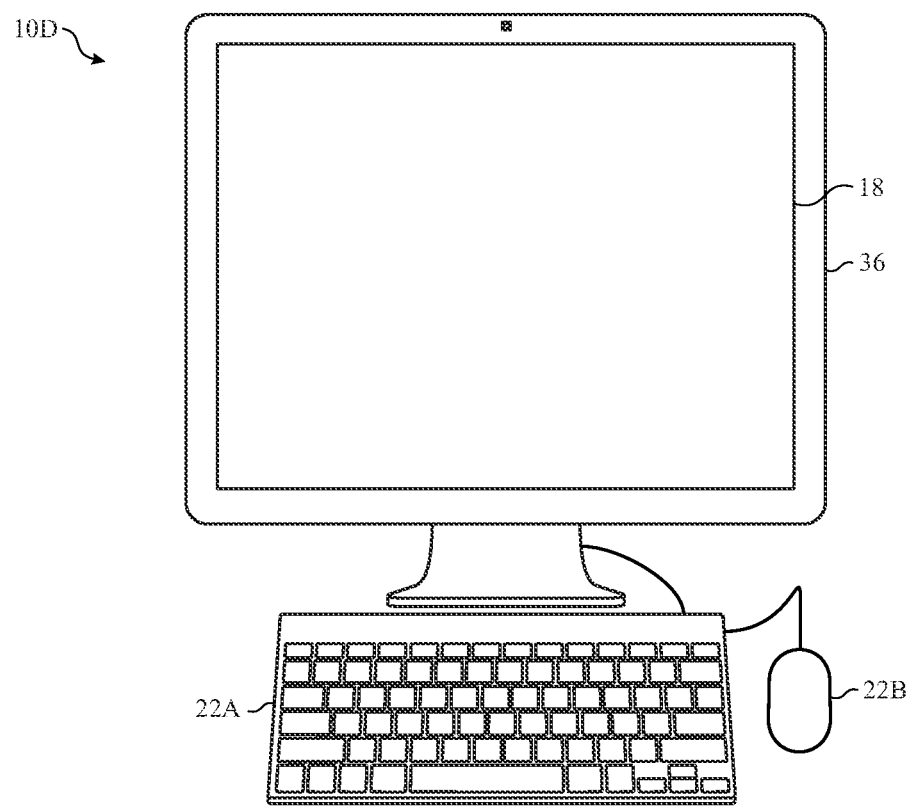
FIG. 5 is a front view of a desktop computer employing the polymer capacitors described herein, in accordance with an embodiment of the present disclosure.
Figure 6:
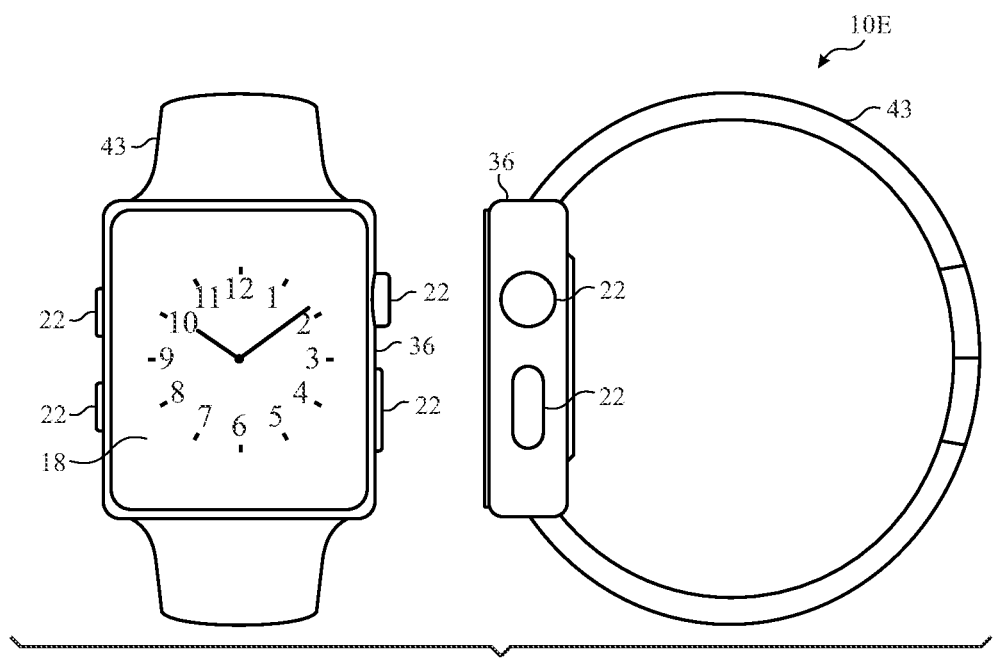
FIG. 6 is a front and side view of a wearable electrical device employing the polymer capacitors described herein, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. Network interfaces 26 such as the one described above may benefit from the use of tuning circuitry, impedance matching circuitry and/or noise filtering circuits that may include polymer capacitors such as the ones described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
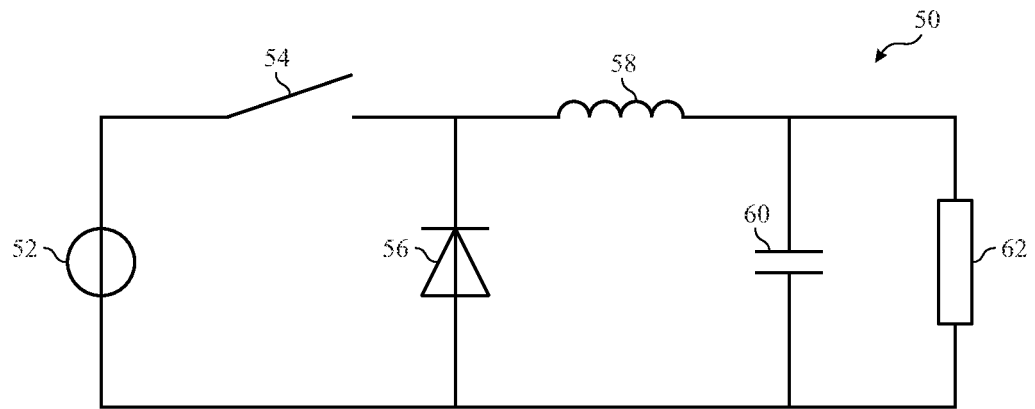
FIG. 7 is a circuit diagram of a buck circuit having a polymer capacitor described herein, in accordance with an embodiment of the present disclosure.

The electronic device 10 described above may include one or more polymer capacitors in its power source 28 (e.g., power supply circuitry). For example, the power source 28 may include a buck converter having one or more polymer capacitors as disclosed herein. The buck converter is a direct current-direct current (DC-DC) converter, which may reduce voltage from an input to an output. FIG. 7 is a circuit diagram of a buck converter 50 (e.g., a buck converter circuit), in accordance with an embodiment of the present disclosure. As illustrated, the buck converter 50 has a DC voltage source 52 (e.g., a battery), a switch 54 (e.g., a metal-oxide-semiconductor field-effect transistor (MOSFET)), a diode 56, an inductor 58, the disclosed polymer capacitor 60, and a load/resistor 62. In particular, the DC voltage source 52, the diode 56, the polymer capacitor 60, and the load/resistor 62. When switch 54 is closed (e.g., acting as a short circuit and enabling current to pass through), the current will flow from the battery 52 to the remainder of the buck converter 50. Initially, the inductor 58 may oppose the sudden current increase, storing energy in its magnetic field and reducing the voltage across the load/resistor 62. Eventually, however, the magnetic field may stabilize, causing the inductor 58 to conduct current. Thus, while the switch 54 is closed, the voltage across the load/resistor 62 approaches the input voltage and the current charges the capacitor 60. Meanwhile, the diode 56 is reversed-biased, blocking current from passing through it. When the switch 54 is open (acting as an open circuit and preventing current from passing through), the DC voltage source 52 is cut off from the remainder of the buck converter 50 by the switch 54 and the now forward-biased diode 56. The current flowing through the inductor 58 may begin to decrease, reducing the inductor's 58 magnetic field, and changing the inductor's 58 polarity and making it a new source of current. During this time, the capacitor 60 may discharge, assisting the inductor 58 in supplying current to the load/resistor 62, and thereby ensuring a stable voltage drop until the switch 54 closes bringing the voltage across the load/resistor 62 back up.

Figure 8:
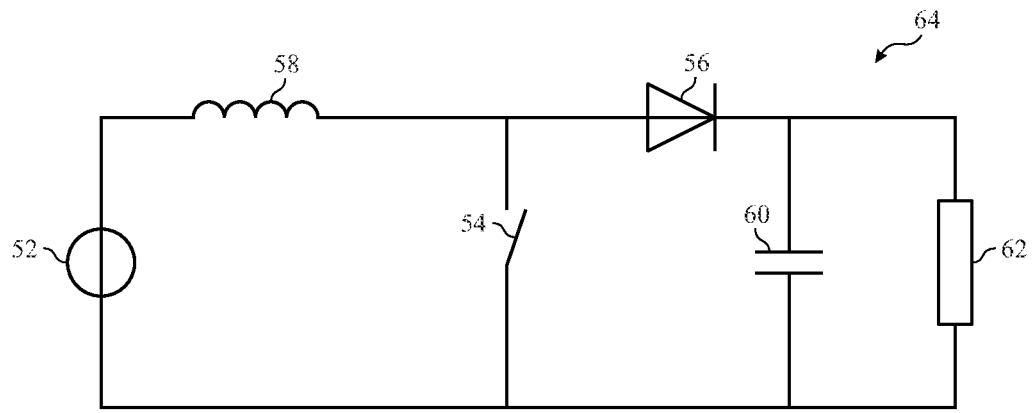
FIG. 8 is a circuit diagram of a boost circuit having a polymer capacitor described herein, in accordance with an embodiment of the present disclosure.

A boost converter is another example of an electrical circuit that may include one or more polymer capacitors 60 as disclosed herein and that may be found in the power source 28 of the electronic device 10. Like the buck converter 50, the boost converter 64 is a DC-DC converter. However, instead of reducing the voltage from input to output, the boost converter increases the voltage. FIG. 8 is a circuit diagram of a boost converter 64 (e.g., a boost converter circuit), according to an embodiment of the present disclosure. The boost converter 64 has similar electrical components as the buck converter 50, though the components may be arranged differently. The boost converter 64 may include the DC voltage source 52 (e.g., a battery), the switch 54 (e.g., a MOSFET), the diode 56, the inductor 58, the polymer capacitor 60, and the load/resistor 62. When the switch 54 is closed, current may flow through the inductor 58 and the switch 54. During this time, the inductor 58 may accumulate energy. When the switch 54 opens (turns off), the inductor 58 may release the stored energy by pushing a current through the diode 56 charging the polymer capacitor 60. When the switch 54 closes again, the polymer capacitor 60 may supply voltage and energy to the load/resistor 62. During this time, the diode 56 may prevent the polymer capacitor 60 from discharging through the switch 54. The switch 54 may open again (e.g., within a threshold period of time) to prevent the polymer capacitor 60 from excessive discharge. Thus, repeating the cycle of closing and opening the switch 54 may further build up output voltage in the boost converter 64.

Figure 9A:
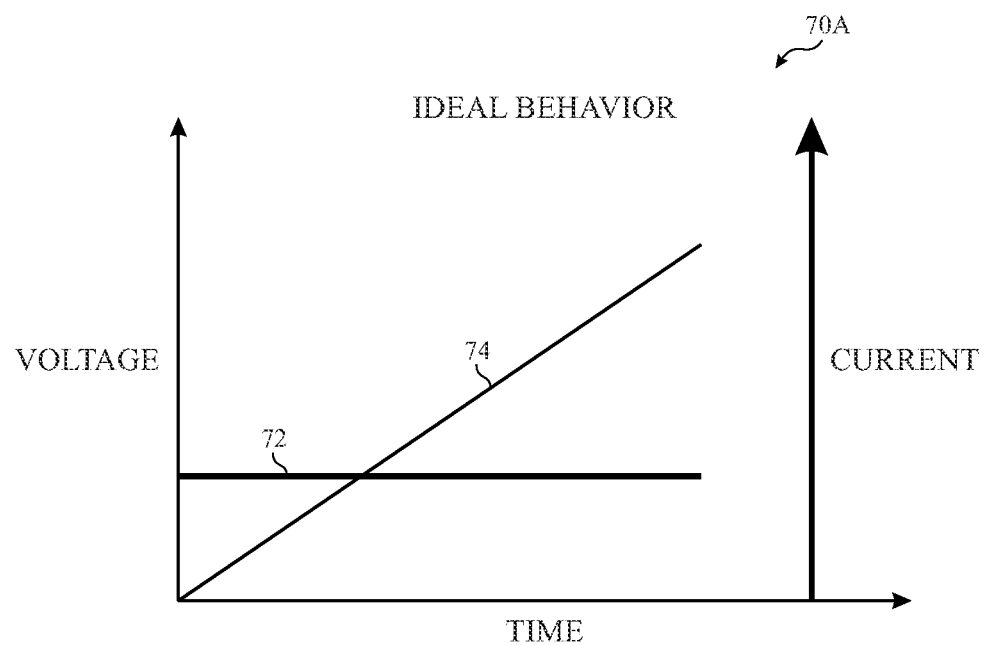
FIG. 9A is a graph of a change of current and voltage with time in an ideal polymer capacitor circuit.
Figure 9B:
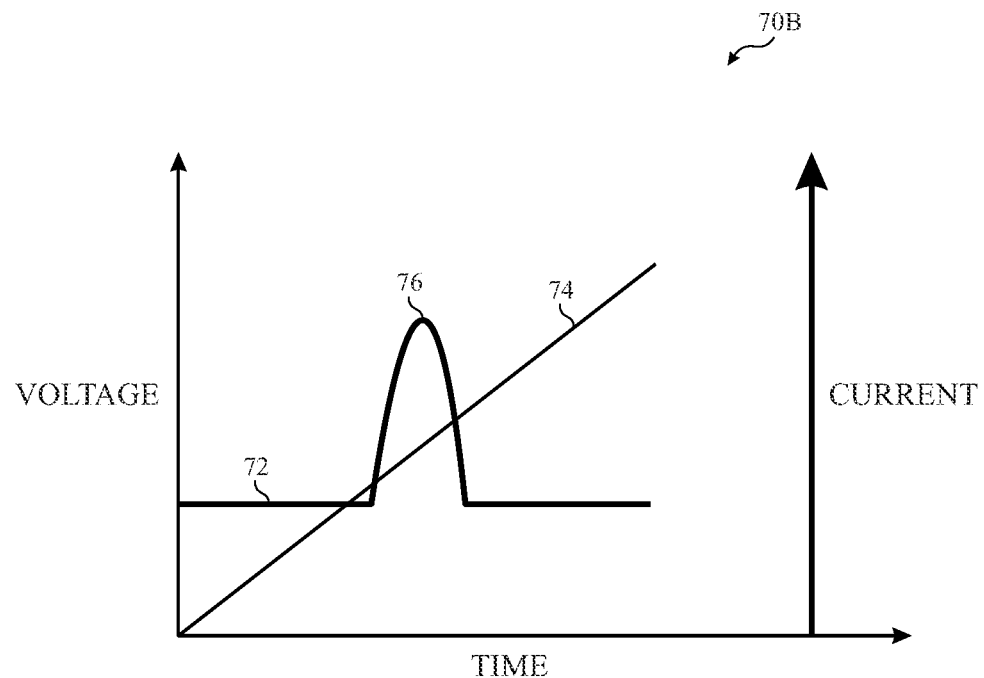
FIG. 9B is a graph of a change of current and voltage with time in a polymer capacitor circuit exhibiting anomalous charging current behavior.

Polymer capacitors (such as the polymer capacitor 60) may be used in the DC-DC power circuits described above to bulk or boost voltage per load requirement. Such circuits may rely on ideal or near ideal charging of the polymer capacitor 60. Hypothetically, a capacitor 60 may demonstrate stable current as voltage across the capacitor 60 linearly rises, as shown in FIG. 9A below. If anomalous charging of the polymer capacitor 60 happens, as shown in FIG. 9B below, the buck 50 and boost 64 converters may be incapable of regulating voltage in a power circuit as designed.

FIG. 9A is a graph 70A of a change in current 72 and voltage 74 with time in an ideal polymer capacitor circuit. In a circuit with an ideal polymer capacitor and a voltage source, the current-voltage relation is governed by the formula shown in Equation 1 below:

$$I = C \times \frac{dV}{dt} \qquad \text{(Equation 1)}$$

where I is the current 72 in the circuit, C is the capacitance of the polymer capacitor, and V is the voltage 74 across the polymer capacitor. Therefore, the current 72 is proportional to the rate of change in voltage 74 with respect to time. If voltage 74 across the capacitor increases linearly, then the current 72 will be constant, as shown on the graph 70A. Such a current-voltage relationship may lead to proper operation of the power circuits and may be found in the polymer capacitor where the interface-limited conduction mechanisms (e.g., thermionic emission, thermionic-field emission, field emission, direct tunneling, Fowler-Nordheim tunneling) and the bulk-limited conduction mechanisms (e.g., ionic conduction, Poole-Frenkel emission and hopping) are absent, reduced, or mitigated.

FIG. 9B is a graph 70B of a change in current 72 and voltage 74 with time in a polymer capacitor circuit exhibiting the anomalous charging current phenomenon. Due to the aforementioned bulk-limited conduction mechanisms and interface-limited conduction mechanisms, the current 72 in the polymer capacitor circuit may not accurately follow the formula or relationship shown in Equation 1 above, particularly when the change of voltage is fast. Instead, when a medium-to-high (but lower than the voltage rating of the capacitor) voltage 74 is applied by the voltage source, the current 72 may rise much faster than the rate change in voltage 74 with time, resulting in anomalous charging current behavior 76 (e.g., a current spike or sharp increase of current), and higher power demand. As mentioned, such anomalous charging current behavior may cause polymer capacitors to output unpredictable current waveforms, prevent the polymer capacitors from charging properly, and/or compromise the circuits that incorporate such polymer capacitors.

Figure 10:
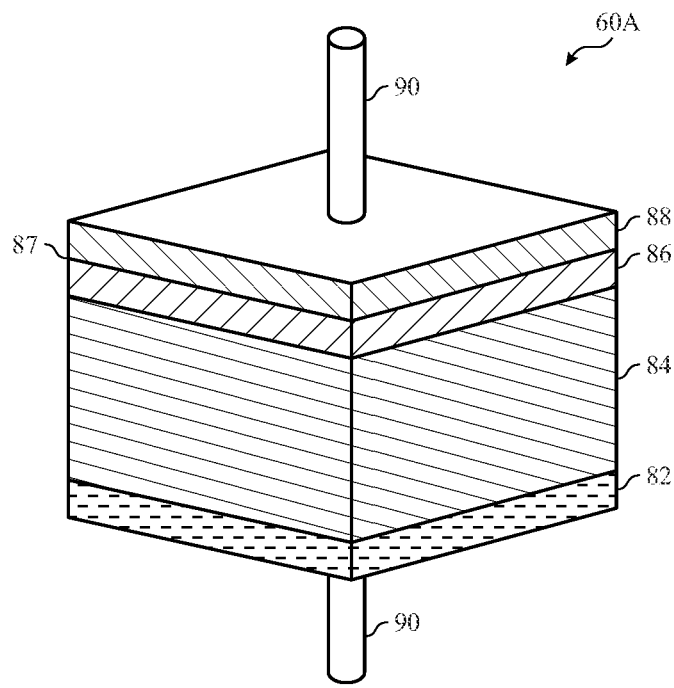
FIG. 10 is a perspective diagram of a polymer capacitor with a wide band gap material layer between an insulator/dielectric and a semiconductive cathode (e.g., a polymer cathode), in accordance with an embodiment of the present disclosure.

However, the disclosed polymer capacitors 60 may mitigate the anomalous charging current phenomenon. A first embodiment may include a wide band gap material layer between the insulator/dielectric and the semiconductive cathode in the polymer capacitor 60. FIG. 10 shows a perspective diagram of a polymer capacitor 60A with a wide band gap material layer 86 between the insulator/dielectric 84 and the semiconductive cathode 88, in accordance with an embodiment. Band gap may refer to a minimum energy that a valence electron (e.g., an electron that is bound to an atom and cannot contribute to electrical conductivity) needs to gain to become a conduction electron (e.g., an electron that is not bound to an atom and moves within a solid contributing to electrical conductivity). The valence electron is said to be in a valence band (e.g., a group of energy levels that bound electrons may have) while the conduction electron is said to be in a conduction band (e.g., a group of energy levels that unbound electrons may have). In other words, the band gap may refer to a difference between the lowest energy in the conduction band and highest energy in the valence band. In molecular materials such as conducting polymers, band gap may refer to an energy difference between an electron in a lowest unoccupied molecular orbital (LUMO) and an electron in a highest occupied molecular orbital (HOMO). HOMO and LUMO in molecular materials (e.g., conducting polymers) may be analogous to valence and conduction bands in solids (e.g., Ta, Nb, NbO, Al, $Ta_2O_5$, $Nb_2O_5$, $Al_2O_3$, and so on). Thus, a wide band gap material may include a material where an energy difference between the lowest energy in the conduction band and the highest energy in the valence band is greater than that of the insulator/dielectric 84. A wide band gap material may also include a material where an energy difference between LUMO and HOMO (e.g., used to promote an electron from the LUMO to the HOMO of the wide band gap material) is greater than an energy difference (e.g., a minimum energy difference) between the conduction band and the valence band in the insulator/dielectric 84 (e.g., used to promote an electron from the conduction band to the valence band of the insulator/dielectric 84). Additionally, because the wide band gap material may include the material where an energy difference between the lowest unoccupied electronic levels (e.g., LUMO or lowest energy in the conduction band) and highest occupied electronic levels (e.g. HOMO or highest energy in the valence band) is greater than that in the insulator/dielectric 84, the wide band gap material may also include a material where the lowest energy in the conduction band or energy associated with the LUMO is greater than the lowest energy in the conduction band of the insulator/dielectric 84. In some embodiments, the wide band gap material may include a material where the band gap is 2 electronvolts (eV) and above, 3 eV and above, 4 eV and above, 5 eV and above, and so on, such as 4.4 eV and above. The wide band gap material may require more energy to promote (e.g., transfer) a valence electron into the conduction band than the energy to do so in the insulator/dielectric 84. Thus, the wide band gap material may act as an increased energy barrier for the conduction electrons.

Separating the semiconductive cathode 88 and the insulator/dielectric 84 with a wide band gap material layer 86 may mitigate, reduce, or decrease the anomalous charging current by blocking/reducing the interface-limited conduction mechanisms (e.g., thermionic emission, thermionic-field emission, field emission, direct tunneling, and/or Fowler-Nordhiem tunneling). That is, the wide band gap material layer 86 at the cathode-dielectric interface 87 may increase an energy barrier that electrons would need to overcome to move across the interface 87, reducing thermionic emission and field-thermionic emission across the interface 87. Moreover, increased thickness of the non-conductive layers (including the insulator/dielectric 84 and the wide band gap material layer 86) and/or the increased energy barrier may reduce a probability of electrons tunneling through (e.g., field emission) by increasing the tunneling width. Additionally, the heightened energy barrier may facilitate restricting the bulk-limited current associated with Poole-Frenkel hopping by reducing or minimizing electron injection into energy "traps" inside a valence band of the dielectric 84.

As illustrated, the polymer capacitor 60A includes several layers deposited/grown one on top of another. A conductive anode 82 of the polymer capacitor 60A may be made of a metal or a material with metallic conductivity, such as tantalum (Ta), niobium (Nb), niobium monoxide (NbO), aluminum (Al), and so on. The insulator/dielectric 84 disposed on the conductive anode 82 may include an electrical insulator, such as tantalum pentoxide ($Ta_2O_5$), niobium pentoxide ($Nb_2O_5$), aluminum (III) oxide ($Al_2O_3$), and the like. The wide band gap material layer 86 disposed on the insulator/dielectric 84 may be made of materials with the electronic band gap higher than the electronic band gap of the insulator/dielectric. The wide band gap material layer 86 may be made of oxide, nitride, carbide, and/or polymer materials, including silicon nitride ($Si_3N_4$) (having a band gap of approximately 5.3 electronvolts (eV)), silicon dioxide ($SiO_2$) (having a band gap of approximately 9.0 eV), zirconium dioxide ($ZrO_2$) (having a band gap of approximately 5.8 eV), hafnium oxide ($HfO_2$) (having a band gap of approximately 5.8 eV), lanthanum(III) oxide ($La_2O_3$) (having a band gap of approximately 6.0 eV), yttrium oxide ($Y_2O_3$) having a band gap of approximately 6.0 eV), polyethylene (having a band gap of approximately 6.9 eV), and/or polypropylene (having a band gap of approximately 7.0 eV). Additionally, the semiconductive cathode 88 may be made of poly (3,4-ethylenedioxythiophene) (PEDOT), poly (3,4-ethylenedioxythiophene) and polystyrene sulfonate (PSS) slurry (PEDOT:PSS), or polypyrrole (PPy) may be disposed on the wide band gap material layer 86. Conductive electrodes 90 may be in contact with the conductive anode 82 and the semiconductive cathode 88 of the polymer capacitor 60A.

Figure 11:
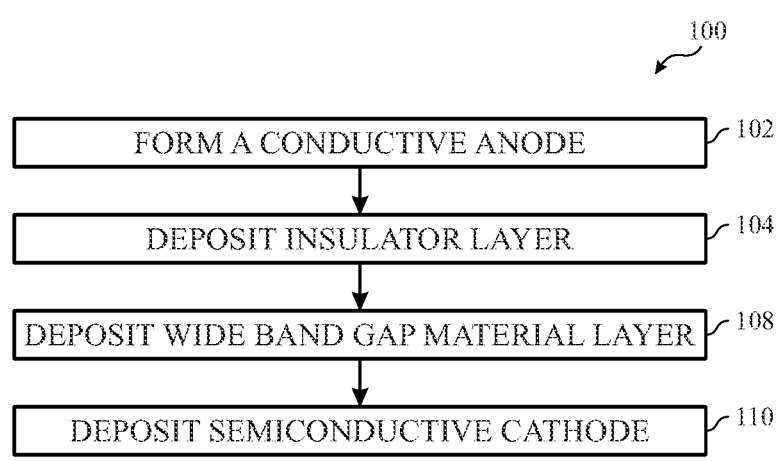
FIG. 11 is a flowchart of a method for producing the polymer capacitor of FIG. 10, in accordance with an embodiment of the present disclosure.

FIG. 11 is a flowchart of a method 100 for producing the polymer capacitor 60A with a wide band gap material layer 86 between the insulator/dielectric 84 and the semiconductive cathode 88, in accordance with an embodiment of the present disclosure. The method 100 starts with forming the conductive anode 82 (block 102). As mentioned earlier, the conductive anode 82 may be made of a metal or a material with metallic conductivity, such as tantalum, niobium, niobium monoxide, and/or aluminum. Conductive anodes may come in various forms: a porous pellet, a film, or a foil. The porous pellet anode may have a higher volumetric capacitance per unit of mass (due to higher surface area) than the film or foil anodes and may be more commonly used in tantalum-based, niobium-based, and niobium monoxide-based polymer capacitors where higher charge density (which may be defined as capacitance(C)*voltage(V)/gram (g)) is preferred. Production of pellets for use in capacitors may include pressing and compacting tantalum, niobium, or niobium monoxide powder into a pellet. The pressed pellets then undergo a sintering process where the pellets are heated in a vacuum. Sintering allows pressed powder particles to stick together so that they can hold an electrode wire. Film anodes are produced by depositing anode material (e.g., Ta, Nb, NbO, Al) onto an inert substrate using physical or chemical deposition techniques (e.g., physical vapor deposition, sputtering deposition, pulsed laser deposition, chemical vapor deposition, and so on), as will be discussed later. Foil anode is made of metal foil, and may be produced by hammering or rolling the metal (e.g., Al, Ta, Nb) to a desired thickness. The foil to be used in anodes may be electrochemically etched to increase its surface area.

An insulator/dielectric 84 is then deposited/grown on the conductive anode 82 (block 104). The insulator/dielectric 84 may include an oxide of the metal found in the conductive anode 82, such as $Ta_2O_5$, $Nb_2O_5$, or $Al_2O_3$. For example, if the conductive anode 82 is made of tantalum, the insulator/dielectric 84 may be made of $Ta_2O_5$. The insulator/dielectric 84 may be deposited/grown on the conductive anode 82 using any suitable or variety of physical, chemical, and/or electrochemical deposition techniques.

For example, one electrochemical deposition technique used to grow the metal oxide insulator/dielectric 84 of the polymer capacitors 60A is electrochemical anodic oxidation (later referred to as electrochemical anodization). Electrochemical anodization involves submerging two terminals connected to a voltage source into an electrolyte solution (e.g., solution of weak acid), wherein a positive terminal is the conductive anode 82 of the polymer capacitor 60A. Applying a DC voltage to the terminals creates oxidation reactions at the positive terminal that form a metal oxide film on the conductive anode 82. A total thickness of the metal oxide film (e.g., the insulator/dielectric 84) may be determined by a voltage (e.g., a formation voltage) applied during the anodization process. Because the thickness of the insulator/dielectric 84 may be proportional to the voltage rating of a polymer capacitor 60A, the voltage rating can be controlled by the voltage applied during the anodization process. The voltage rating may be the maximum amount of voltage that a polymer capacitor 60A can safely be exposed to. The higher the voltage rating, the thicker the insulator/dielectric layer 84 of the polymer capacitor 60A. For example, for a $Ta_2O_5$, $Nb_2O_5$, or $Al_2O_3$ capacitor, the thickness of the oxide film associated with a 1 Volt (V) voltage rating may be between 1 nanometers (nm) and 5 nm, 2 nm and 4 nm, or 1 nm and 3 nm, such as 1.4 nm and 2.5 nm, depending upon the selected chemistry and process. As another example, if the voltage range of interest is 1.5 V to 100 V, a formation voltage may vary from 2.0 V to 300 V, which means the thickness of oxide film may be between 1 nm and 2000 nm, 2 nm and 1000 nm, or about 3 nm and 750 nm. Other advantages of electrochemical anodization are that it is a relatively inexpensive process, and that it enables easy addition of doping impurity into the metal oxide film. However, in some circumstances, the electrochemical anodization may lead to a presence of oxygen and/or metal vacancies in the metal oxide film, which could result in the bulk-limited current contribution to the abnormal charging current.

Another technique that may be used to deposit the insulator/dielectric 84 is sputtering deposition. In particular, radio frequency (RF) sputtering is suitable for depositing metal oxide films. RF sputtering involves placing the target material (e.g., the insulator/dielectric material 84 to be coated onto the conductive anode 82) and the substrate (e.g., the conductive anode 82 of the polymer capacitor 60A) in a vacuum chamber with ionized inert gas (e.g., Argon gas). The target material, which is given a negative charge, may be bombarded by high energy ions sputtering off atoms as a fine spray, which may cover the substrate. An alternating current (AC) that oscillates at a radio frequency (e.g., 13.56 MHz) is used to periodically alter the charge of the target, clearing it of a build-up of positive ions that would have prevented continued sputtering.

As illustrated, the wide band gap material layer 86 is deposited atop the metal oxide film (block 108). In general, the wide band gap layer 86 may be made of oxides, nitrides, carbides and/or polymer materials, where the energy difference between a lowest energy in the conduction band of the wide band gap layer 86 and a highest energy in the valence band of the wide band gap layer 86 is higher than that of the insulator/dielectric 84. Such materials may include $Si_3N_4$, $SiO_2$, $ZrO_2$, $HfO_2$, $La_2O_3$, $Y_2O_3$, polyethylene, and/or polypropylene. These materials may be deposited/grown using a variety of different methods including sputtering, pulsed laser deposition (PLD), atomic layer deposition (ALD), metal organic chemical vapor deposition (MOCVD), electrochemical anodization, other physical vapor deposition (PVD) methods, and/or other chemical vapor deposition (CVD) methods. The deposition process may be selected based on a type of material used and/or a desired thickness of the layer, which may range from 1 picometer (pm) to 1 centimeter (cm), 100 pm to 100 millimeters (mm), 0.1 nanometer (nm) to 1.0 mm, and so on.

PVD is a category of vacuum deposition methods where material transition from a condensed phase to a vapor phase, and then back to a condensed phase depositing a thin film or a coating. Sputtering and PLD are two examples of PVD methods. As mentioned earlier, sputtering uses ionized inert gas in a vacuum environment to eject atoms from a target (e.g., a material that is to be deposited) onto a substrate. PLD uses a high-power pulsed laser beam focused inside a vacuum chamber to strike a target (e.g., material that is to be deposited) and create a plasma plume that deposits the target material as a thin film onto the substrate.

CVD is a category of deposition methods where constituents in a vapor phase react to form a solid film/coating on a surface of a substrate. CVD is different from PVD in that it is a multidirectional type of deposition (e.g., able to coat a three-dimensional (3D) structure), whereas PVD is a line-of-site type of deposition (e.g., able to coat one surface of a two-dimensional (2D) structure). Atomic layer deposition is a CVD method involving sequential reagent exposures and surface-limited reactions to yield very thin films for precise control over coating thickness and superior 3D surface coverage. Like ALD, MOCVD is also CVD technique for creating very thin coatings. However, it may result in epitaxial (e.g., highly ordered, mono- or polycrystalline) films. MOCVD involves combining various reactant gases at elevated temperatures causing chemical reactions and resulting in the deposition of materials on the substrate. It is particularly useful in growing semiconductor films.

The semiconductive cathode 88 is then deposited on the wide band gap material layer 86 (block 110). In particular, the polymer capacitor 60A may be capped with the semiconductive cathode 88. For example, the semiconductive cathode 88 may be made of PEDOT, PEDOT:PSS, and/or PPy conducting polymers. The semiconductive cathode 88 may be deposited using chemical polymerization, electrochemical polymerization, PVD, and/or CVD methods. Moreover, PEDOT may be polymerized in-situ (e.g., on the insulator/dielectric 84 or wide band gap material layer 86 of the polymer capacitor 60A) by the oxidation of 3,4-ethylenedioxythiophene (EDOT) with catalytic compositions. PEDOT may also or alternatively be deposited onto the polymer capacitor 60A as a pre-polymerized slurry, PEDOT:PSS. For polymer capacitors 60A having the conductive anode 82 made of a porous pellet, a size of particles in the pre-polymerized PEDOT:PSS slurries may be too large to penetrate into the porous pellet of the polymer capacitors 60A (e.g., a size of particles in the pellet is smaller than that of the size of the particles in the pre-polymerized PEDOT:PSS slurries) and assure sufficient or full surface coverage of the insulator/dielectric 84. Therefore, to achieve certain desired electrical properties of the polymer capacitors 60A, PEDOT may be first polymerized in-situ, and then deposited as pre-polymerized PEDOT:PSS slurry. However, in certain other cases (e.g., in which the conductive anode 82 is not made of the porous pellet or where the size of the particles in the porous pellet is large), having only pre-polymerized PEDOT:PSS or only in-situ polymerized PEDOT may be advantageous. When PPy is used in the semiconductive cathode 88, PPy may be polymerized in-situ through the oxidative polymerization of pyrrole. Additionally or alternatively, PPy can also be formed in-situ using electrochemical polymerization.

Figure 12:
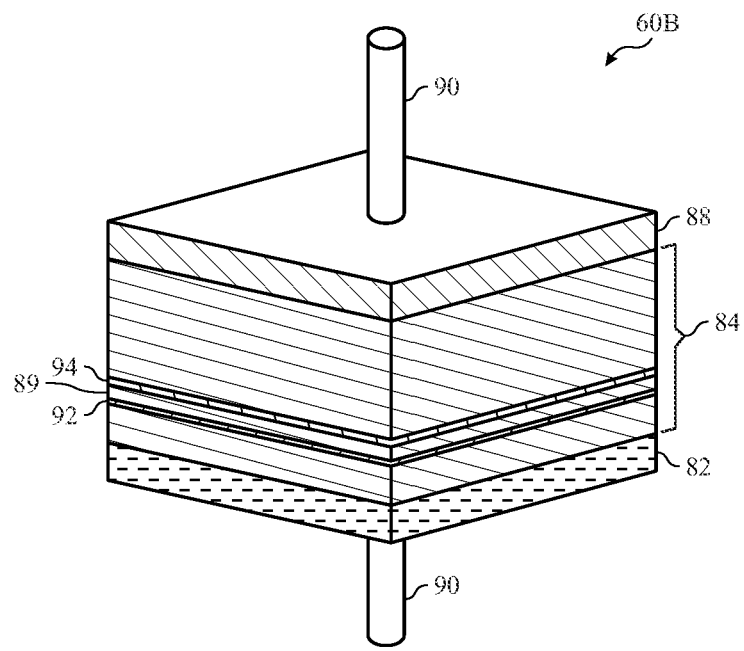
FIG. 12 is a perspective diagram of a polymer capacitor with charge depletion region in the insulator/dielectric, in accordance with an embodiment of the present disclosure.

An additional or alternative embodiment that may mitigate, reduce, or decrease the anomalous charging current phenomenon has a charge depletion region inside the insulator/dielectric 84. FIG. 12 is a perspective diagram of a polymer capacitor 60B with a charge depletion region 89 in the insulator/dielectric 84, in accordance with an embodiment of the present disclosure. The polymer capacitor 60B includes a conductive anode 82 made of a metal or a metallic material (e.g., Ta, Nb, NbO, or Al). An insulator/dielectric 84 (e.g., $Ta_2O_5$, $Nb_2O_5$, $Al_2O_3$) may be in contact with or adjacent to the conductive anode 82. The insulator/dielectric 84 has a charge depletion region 89 having a charge donor (e.g., n-type or negative type) doping impurity 92. In some embodiments, the charge depletion region 89 may also include a charge acceptor (e.g., p-type or positive type) doping impurity 94. The charge acceptor doping impurity 94 may be made from an element or a compound from Group 13 in the periodic table, such as boron (B) or gallium (Ga). In addition, the charge donor doping impurity 92 may be made from an element or a compound from Group 15 in the periodic table, such as phosphorus (P), arsenic (As) or antimony (Sb). The n-type and p-type doping impurities 92 and 94 may form a p-n junction and the charge depletion region 89, which may reduce a number of, or altogether prevent, charge carriers from passing through. Thus, the resulting charge depletion region 89 may mitigate the bulk-limited current associated with oxygen and metal vacancies as voltage quickly increases. The polymer capacitor 60B may also have semiconductive cathode 88 and conductive electrodes 90.

Figure 13:
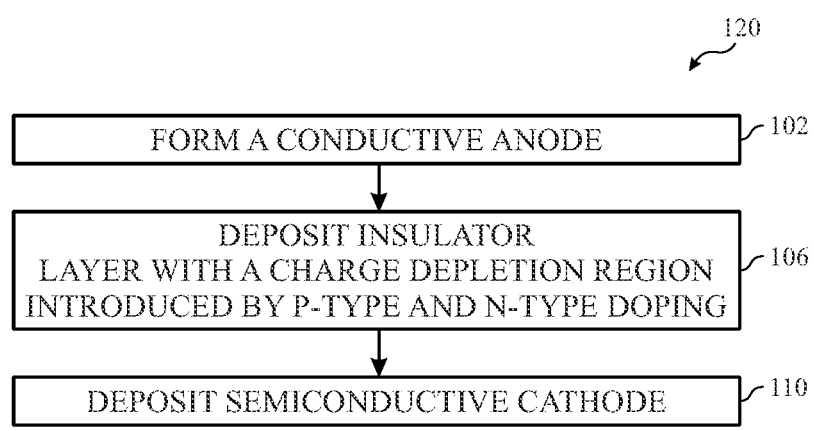
FIG. 13 is a flowchart of a method for producing the polymer capacitor of FIG. 12, in accordance with an embodiment of the present disclosure.

Now, we turn to the method of production of the polymer capacitor 60B with a charge depletion region 89 in the insulator/dielectric 84. FIG. 13 is a flowchart of a method 120 for producing the polymer capacitor 60B with the charge depletion region 89 in the insulator/dielectric 84, in accordance with an embodiment of the present disclosure. The first step in the production method 120 is to form the conductive anode 82 of the polymer capacitor 60B (block 102, as discussed in more detail above with respect to the method 100 of FIG. 11). As mentioned earlier, the conductive anode 82 may be made of a porous pellet (e.g., a pressed and sintered pellet of Ta, Nb, or NbO powder), a film (e.g., a film of Ta, Nb, NbO, or Al), or a foil (e.g., etched foil of Ta, Nb or Al).

An insulator/dielectric 84 with a charge depletion region 89 is deposited over the conductive anode 82 (block 106). Depositing the insulator/dielectric 84 with a charge depletion region 89 may include a multistep process. First, a layer of insulator/dielectric 84 (e.g., $Ta_2O_5$, $Nb_2O_5$, $Al_2O_3$) is deposited/grown over the conductive anode 82. Next, an n-type (electron donor) doping impurity 92 made of an element from Group 15 of the periodic table (e.g., P, As, Sb) may be introduced. A layer of undoped insulator/dielectric 84 may then be added, followed by a p-type impurity made of an element from Group 13 of the periodic table (e.g., P, As, or Sb). The insulator/dielectric 84 with the charge depletion region 89 may be completed by growing the undoped insulator/dielectric 84 (e.g., $Ta_2O_5$, $Nb_2O_5$, $Al_2O_3$) to a final thickness of the layer.

The doping impurities 92 and 94 may be introduced using electrochemical anodization, vapor phase epitaxy, PVD, ion diffusion and ion implantation. The metal oxide or insulator/dielectric 84 may be doped using electrochemical anodization by adding the impurity element or compound (e.g., B, Ga, P, As, Sb) to the electrolyte solution that oxidizes the conductive anode 82. Vapor phase epitaxy (such as MOCVD) involves combining various reactant gases and metaloranic precursors to produce chemical reactions that form crystals of the impurity element or compound (e.g., B, Ga, P, As, Sb). Ion diffusion (e.g., gas phase, liquid phase, or solid phase diffusion) may carry the doping elements or compounds (e.g., B, Ga, P, As, Sb) from a region of higher concentration to one of lower concentration. To add an impurity using ion implantation, charged dopants (e.g., B, Ga, P, As, Sb) may be accelerated in an electric field and irradiated onto the substrate (e.g., the insulator/dielectric 84 of the polymer capacitor 60B). A penetration depth of the impurity into the substrate can be set by varying a voltage needed to accelerate the ions.

The semiconductive cathode 88 is then deposited on the insulator/dielectric 84 (block 110, as discussed in more detail above with respect to the method 100 of FIG. 11). In particular, the polymer capacitor 60B is capped with the semiconductive cathode 88. As mentioned earlier, the semiconductive cathode 88 may be made of PEDOT or PPy conducting polymers. Moreover, PEDOT may be polymerized in-situ and/or be deposited as or in combination with pre-polymerized PEDOT:PSS slurry. PPy is an alternative to PEDOT that is typically chemically or electrochemically polymerized in-situ. The conducting polymers may be deposited as the semiconductive cathode 88 using chemical polymerization, electrochemical polymerization, PVD, and/or CVD methods.

Figure 14:
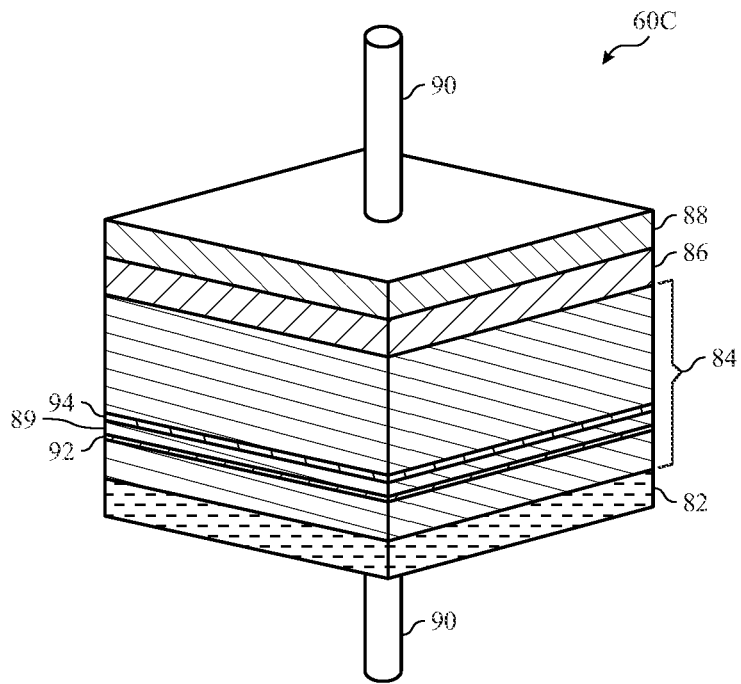
FIG. 14 is a perspective diagram of a polymer capacitor with the charge depletion region in the insulator/dielectric and the wide band gap material layer between the insulator/dielectric and the semiconductive cathode, in accordance with an embodiment of the present disclosure.

In some embodiments, the two polymer capacitors 60A, and 60B described above may be combined to into a single polymer capacitor 60C that has both a wide band gap material layer 86 between the insulator/dielectric 84 and the semiconductive cathode 88 and a charge depletion region 89 in the insulator/dielectric 84. FIG. 14 is a perspective diagram of the polymer capacitor 60C, in accordance with an embodiment of the present disclosure. The polymer capacitor 60C may have a conductive anode 82 made of a metal or a metallic material (e.g., Ta, Nb, NbO, Al), and an insulator/dielectric 84 (e.g., $Ta_2O_5$, $Nb_2O_5$, $Al_2O_3$) with a charge depletion region 89 having an n-type doping impurity 92 and a p-type doping impurity 94. As mentioned earlier, the charge depletion region 89 may mitigate the bulk-limited current associated with oxygen and metal vacancies by preventing charge carriers from passing through it. An element or a compound from Group 13 in the periodic table (e.g., B or Ga) may be used to create a p-type doping impurity 94, and an element or a compound from Group 15 in the periodic table (e.g., P, As, Sb) may be used to create an n-type doping impurity 92. The wide band gap material layer 86 disposed on the insulator/dielectric 84 may be made of oxide, nitride, carbide, polymer, or any other suitable materials that have an electronic band gap wider that of the insulator/dielectric 84. The wide band gap material layer may include $Si_3N_4$, $SiO_2$, $ZrO_2$, $HfO_2$, $La_2O_3$, $Y_2O_3$, polyethylene, and/or polypropylene. A semiconductive cathode 88 may be in contact with or adjacent to the insulator/dielectric 84 having the charge depletion region 89. In addition, conductive electrodes 90 are in contact with the conductive anode 82 and the semiconductive cathode 88.

Figure 15:
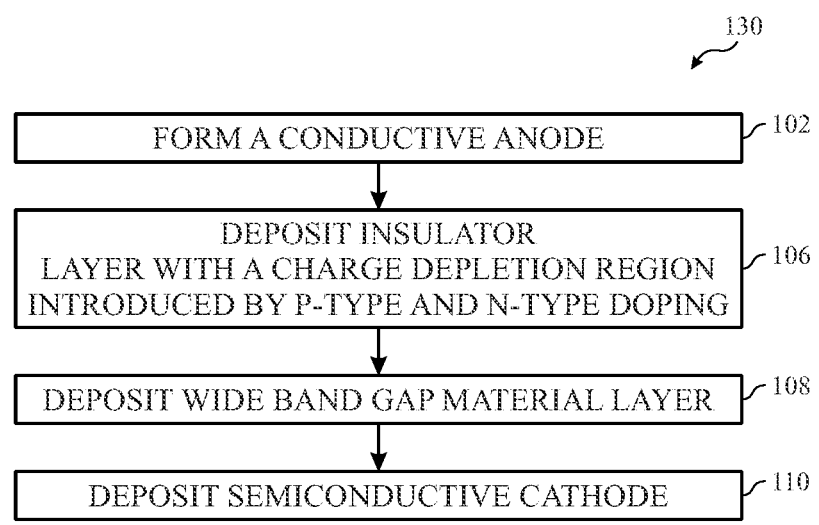
FIG. 15 is a flowchart of a method for producing the polymer capacitor of FIG. 14, in accordance with an embodiment of the present disclosure.

FIG. 15 is a flowchart of a method 130 for producing the polymer capacitor 60C with the charge depletion region 89 in the insulator/dielectric 84, in accordance with an embodiment of the present disclosure. The first step in the production process 130 is to form the conductive anode 82 of the polymer capacitor 60C (block 102, as discussed in more detail above with respect to the method 100 of FIG. 11). As mentioned earlier, the conductive anode 82 may be made of a pressed pellet (e.g., a sintered pellet of Ta, Nb, or NbO powder), a film (e.g., a film of Ta, Nb, NbO, or Al), or a foil (e.g., etched foil of Ta, Nb, or Al).

An insulator/dielectric 84 with a charge depletion region 89 is then deposited over the conductive anode 82 (block 106, as discussed in more detail above with respect to the method 100 of FIG. 13). Depositing the insulator/dielectric 84 with the charge depletion region 89 may include a multistep procedure. First, a layer of insulator/dielectric 84 (e.g., $Ta_2O_5$, $Nb_2O_5$, $Al_2O_3$) is deposited/grown. As discussed earlier, this may be accomplished using a variety of different deposition processes, such as PVD, PLD, sputtering, CVD, ALD, MOCVD, and/or electrochemical anodization, among others. Next, an n-type (electron donor) doping impurity 92 made of an element from Group 15 of the periodic table (e.g., P, As, Sb) is introduced. A layer of undoped insulator/dielectric 84 may then be added, followed by a p-type impurity made of an element from Group 13 of the periodic table (e.g., B, Ga). Both electron donor (n-type) and electron acceptor (p-type) doping impurities 92 and 94 may be introduced using electrochemical anodization, vapor phase epitaxy, PVD, ion diffusion, and/or ion implantation. The insulator/dielectric 84 with the charge depletion region 89 may be completed by growing the undoped insulator/dielectric 84 (e.g., $Ta_2O_5$, $Nb_2O_5$, $Al_2O_3$) to a total thickness equivalent to a desired voltage rating. In some embodiments, the voltage rating of the polymer capacitor 60C (as well as polymer capacitors 60A and 60B) may range from 1.5 V to 100 V, from 5 V to 80 V, and from 10 V to 50 V, and so on. In some embodiments, the thickness of the insulator/dielectric 84 corresponding to the voltage rating of the polymer capacitor 60C (as well as polymer capacitors 60A and 60B) may range from 3 nm to 750 nm, from 10 nm to 600 nm, and from 50 nm to 400 nm, and so on.

The insulator/dielectric 84 with the charge depletion region 89 may then be topped with the wide band gap material layer 86 (block 108, as discussed in more detail above with respect to the method 100 of FIG. 11). As mentioned above, the wide band gap layer 86 may be made of metal oxides, nitrides, carbides, and/or polymer materials with an electronic band gap wider than the electronic band gap of the insulator/dielectric 84. The wide band gap layer may include $Si_3N_4$, $SiO_2$, $ZrO_2$, $HfO_2$, $La_2O_3$, $Y_2O_3$, polyethylene, and/or polypropylene. These materials may be deposited/grown using any suitable or variety of methods, including sputtering, pulsed laser deposition (PLD), atomic layer deposition (ALD), metal organic chemical vapor deposition (MOCVD), electrochemical anodization, other physical vapor deposition (PVD), and/or chemical vapor deposition (CVD) methods. The appropriate deposition process may depend on the type of material used as well as the desired thickness of the layer, which may range from 1 picometer (pm) to 1 centimeter (cm), 100 pm to 100 millimeters (mm), 0.1 nanometer (nm) to 1.0 mm, and so on.

The polymer capacitor 60C may then be capped with a semiconductive cathode 88 (block 110, as discussed in more detail above with respect to the method 100 of FIG. 11). As mentioned earlier, the semiconductive cathode 88 may include PEDOT and/or PPy conducting polymers. Moreover, PEDOT may be polymerized in-situ and/or be deposited as or in combination with a pre-polymerized PEDOT:PSS slurry. Additionally or alternatively, PPy may be chemically or electrochemically polymerized in-situ. The conducting polymers may be deposited as a semiconductive cathode 88 using chemical polymerization, electrochemical polymerization, PVD, and/or CVD methods.

Three different polymer capacitors for mitigating the anomalous charging current have been presented: a polymer capacitor 60A with a wide band gap material layer 86; a polymer capacitor 60B with a charge depletion region 89 in the insulator/dielectric 84; and a polymer capacitor 60C with both a wide band gap material layer 86 and a charge depletion region 89 in the insulator/dielectric 84. General methods 100, 120, 130 for producing each polymer capacitor 60A, 60B, 60C have also been described. Specific production methods for the three polymer capacitors 60A, 60B, 60C follow.

Figure 16:
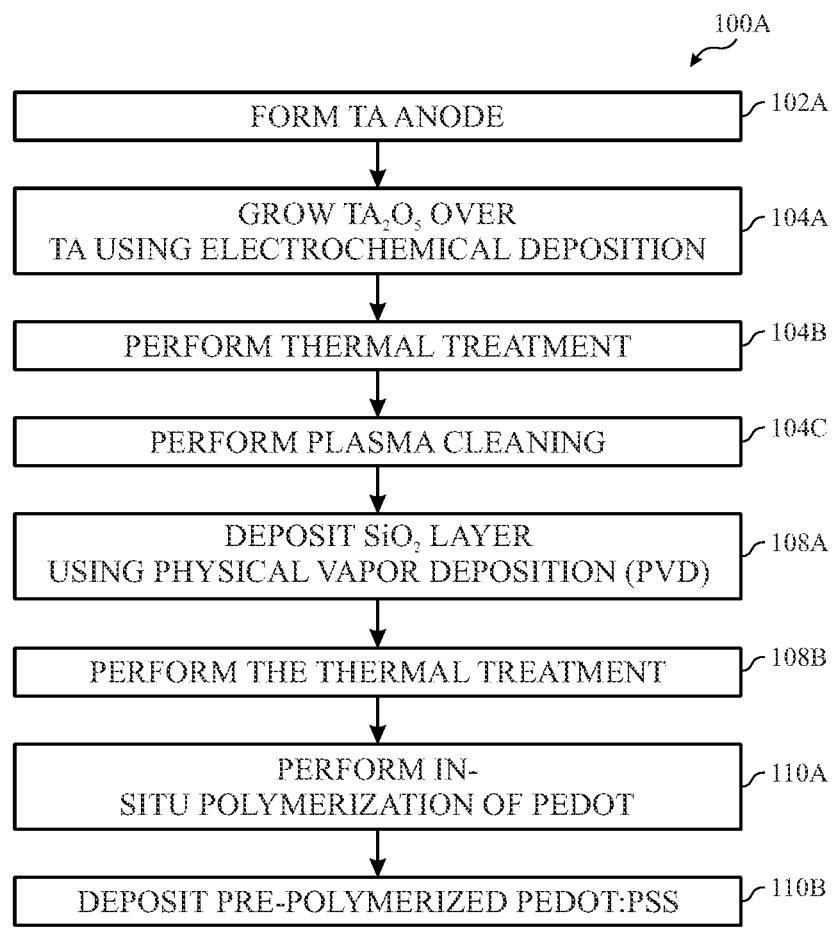
FIG. 16 is a flowchart for producing a tantalum-based polymer capacitor with a wide band gap silicon dioxide ($SiO_2$) layer, in accordance with an embodiment of the present disclosure.

One specific embodiment of the polymer capacitor 60A with a wide band gap material layer 86 may include a tantalum-based polymer capacitor with a wide band gap $SiO_2$ layer. FIG. 16 is a flowchart of a method 100A for producing such a tantalum-based polymer capacitor, in accordance with an embodiment of the present disclosure. The method 100A includes forming a tantalum (Ta) pellet used as the conductive anode 82 (block 102A). Next, $Ta_2O_5$ insulator/dielectric 84 may be grown over Ta in a multistep process (e.g., a specific example of block 104 as discussed above with respect to method 100 of FIG. 11). In particular, $Ta_2O_5$ is grown over Ta using an electrochemical deposition (e.g., electrochemical anodization) (block 104A). Then, a thermal treatment is performed (block 104B), which involves heating and cooling the polymer capacitor 60A at to a desired temperature. The thermal treatment (block 104B) may arrange the atoms of $Ta_2O_5$ insulator/dielectric 84 in a configuration that is more stable under an applied electric field, thus decreasing the bulk-limited conduction within the insulator/dielectric 84. In addition, the thermal treatment (block 104B) may increase the relative permittivity of the insulator/dielectric 84 by modifying its crystalline properties and morphology. The insulator/dielectric 84 may then undergo plasma cleaning in order to remove impurities and contaminants from the electrochemically grown $Ta_2O_5$ (block 104C). After the $Ta_2O_5$ formation is completed, a wide band gap material layer 86 made of $SiO_2$ is deposited using a physical vapor deposition method (e.g., sputtering, pulsed laser deposition, or the like) (block 108A), followed by thermal treatment (block 108B, similar to that of 104B described above). The thermal treatment may improve the crystalline characteristics of the $SiO_2$ wide band gap layer 86. The semiconductive cathode 88 made of PEDOT may then be deposited (as generally described above with respect to block 110 of method 100 in FIG. 11). In particular, PEDOT is polymerized in-situ (block 110A), followed by deposition of pre-polymerized PEDOT:PSS slurry (block 110B).

Figure 17:
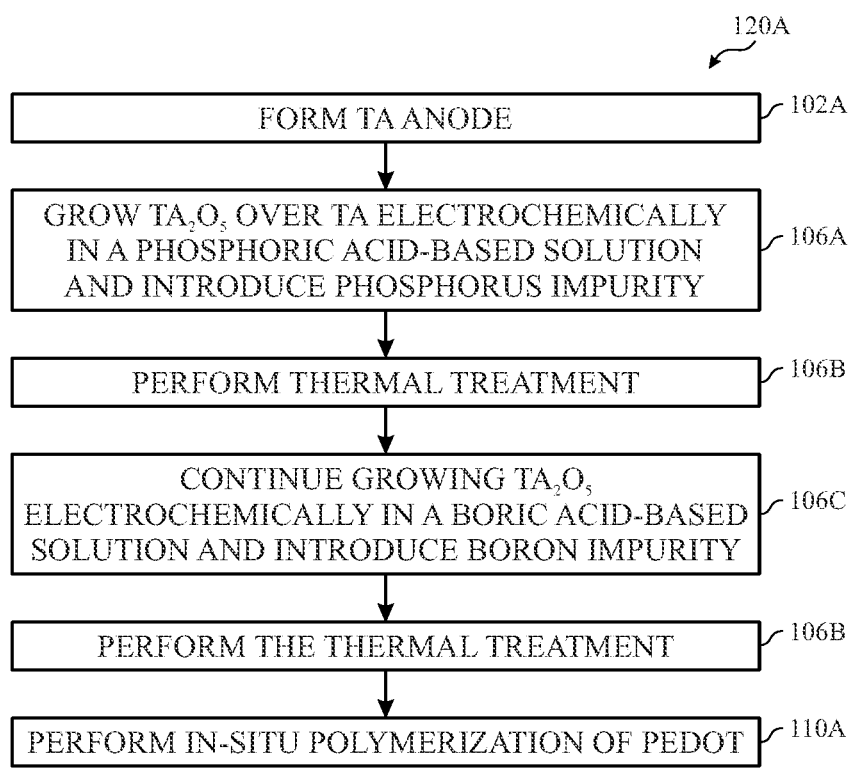
FIG. 17 is a flowchart of a method for producing a tantalum-based polymer capacitor with charge depletion region in the insulator/dielectric introduced by electrochemical deposition, in accordance with an embodiment of the present disclosure.

A specific embodiment of a polymer capacitor 60B with a charge depletion region 89 in the insulator/dielectric 84 is a tantalum-based capacitor with a charge depletion region 89 formed from phosphorus (P) and boron (B) impurities in the insulator/dielectric 84. FIG. 17 is a flowchart of a method 120A for producing such a tantalum-based polymer capacitor, in accordance with an embodiment of the present disclosure. The method 120A includes forming a tantalum (Ta) pellet used as the conductive anode 82 (block 102A). Next, $Ta_2O_5$ insulator/dielectric 84 is grown over Ta in a multistep process (e.g., a specific example of block 106 as discussed above with respect to method 120 of FIG. 13). In particular, $Ta_2O_5$ is grown over Ta in a phosphoric acid-based solution using electrochemical deposition (e.g., electrochemical anodization), and the phosphorus impurity 92 is introduced (block 106A). Then, a thermal treatment is performed (block 106B). The thermal treatment (block 106B) may arrange the atoms of the doped $Ta_2O_5$ insulator/dielectric 84 in a configuration that is more stable under an applied electric field, thus decreasing the bulk-limited conduction within the insulator/dielectric 84. In addition, the thermal treatment (block 106B) may improve crystalline properties and morphology of the insulator/dielectric 84 with the charge depletion region 89, increasing the relative permittivity of the insulator/dielectric 84. $Ta_2O_5$ growth is continued in a boric acid-based solution using electrochemical deposition, and the boron impurity 94 is introduced (block 106C). The electrochemical deposition is followed by another thermal treatment (block 106B). The semiconductive cathode 88 made of PEDOT polymerized in-situ is then formed (block 110A, as generally described above with respect to block 110 of method 120 in FIG. 13)

Figure 18:
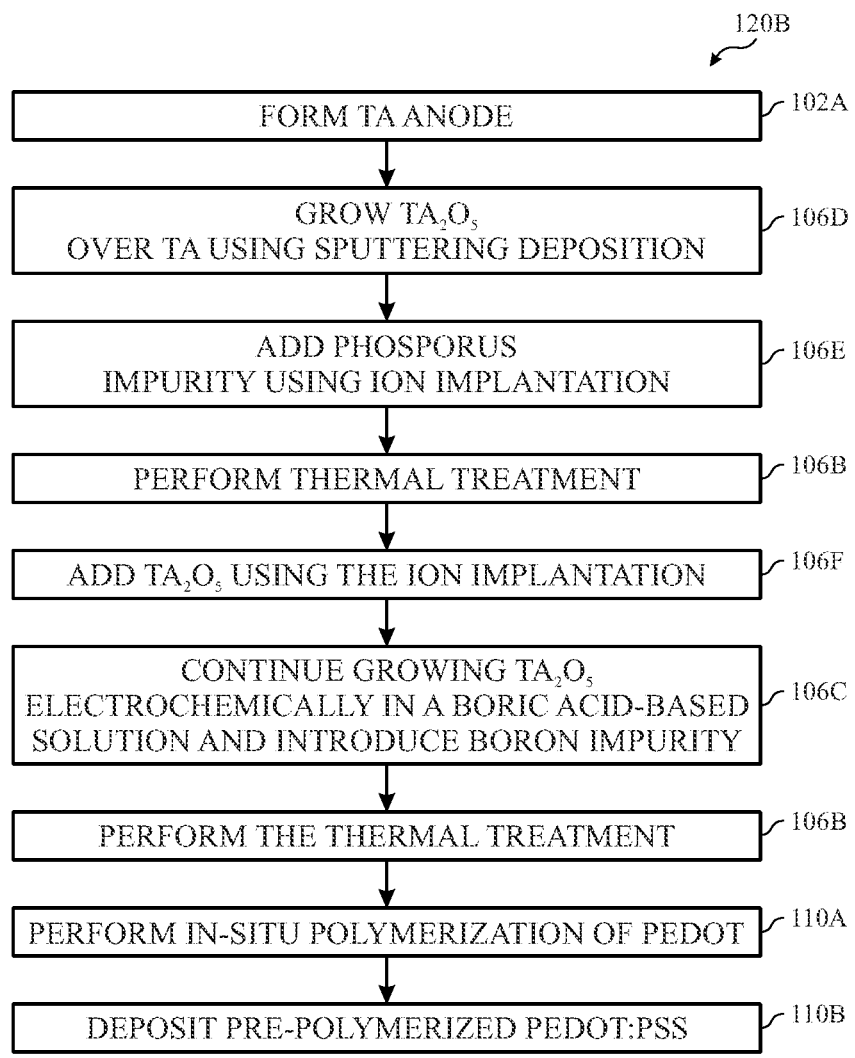
FIG. 18 is a flowchart of a method for producing a tantalum-based polymer capacitor with charge depletion region in the insulator/dielectric introduced by ion implantation and electrochemical deposition, in accordance with an embodiment of the present disclosure.

FIG. 18 presents another method 120B for producing a tantalum-based polymer capacitor 60B with a charge depletion region 89 formed from phosphorus (P) and boron (B) impurities in the insulator/dielectric 84. FIG. 18 is a flowchart of a method 120B for producing such a tantalum-based polymer capacitor, in accordance with an embodiment. The method 120B includes forming a tantalum (Ta) pellet used as the conductive anode 82 (block 102A). Next, $Ta_2O_5$ insulator/dielectric 84 may be grown over Ta in a multistep process (e.g., a specific example of block 106 as discussed above with respect to method 120 of FIG. 13). In particular, $Ta_2O_5$ is deposited over Ta using sputtering (block 106D). The phosphorus impurity 92 is then added using ion implantation (block 106E) followed by a thermal treatment (block 106B). Next, a thin layer of pure $Ta_2O_5$ is added using ion implantation (block 106F). $Ta_2O_5$ growth is continued in a boric acid-based solution using electrochemical deposition (e.g., electrochemical anodization), and a boron impurity 94 is introduced (block 106C). The electrochemical deposition is followed by another thermal treatment (block 106B). The semiconductive cathode 88 made of PEDOT may then be deposited (as generally described above with respect to block 110 of method 120 in FIG. 13). In particular, PEDOT is polymerized in-situ (block 110A), followed by deposition of pre-polymerized PEDOT:PSS slurry (block 110B).

Figure 19:
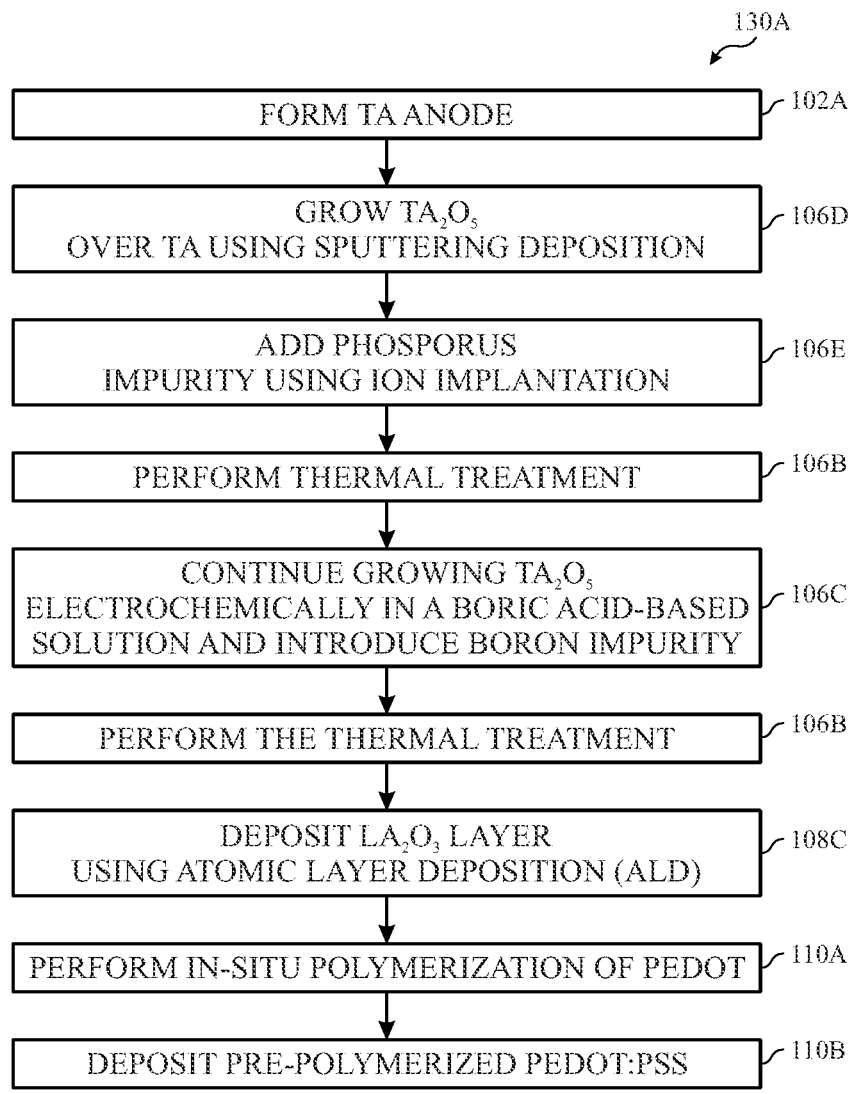
FIG. 19 is a flowchart of a method for producing a tantalum-based polymer capacitor with charge depletion region in the insulator/dielectric and a wide band gap lanthanum(III) oxide ($La_2O_3$) layer, in accordance with an embodiment of the present disclosure.

A specific embodiment of a polymer capacitor 60C with a charge depletion region 89 in the insulator/dielectric 84 and a wide band gap material layer 86 may include a tantalum-based capacitor with a charge depletion region 89 formed from phosphorus (P) and boron (B) impurities in the insulator/dielectric 84, and a wide band gap $La_2O_3$ layer 86. FIG. 19 is a flowchart of a method 130A for producing such a tantalum-based polymer capacitor, in accordance with an embodiment of the present disclosure. The method 130A includes forming a tantalum (Ta) pellet used as the conductive anode 82 (block 102A). Next, $Ta_2O_5$ insulator/dielectric 84 is grown over Ta in a multistep process (e.g., a specific example of block 106 as discussed above with respect to method 130 of FIG. 15). In particular, $Ta_2O_5$ is deposited over Ta using sputtering (block 106D). The phosphorus impurity 92 is then added using ion implantation (block 106E) followed by a thermal treatment (block 106B). Next, a thin layer of pure $Ta_2O_5$ is added using ion implantation (block 106F). $Ta_2O_5$ growth is continued in a boric acid-based solution using electrochemical deposition (e.g., electrochemical anodization), and a boron impurity 94 is introduced (block 106C). The electrochemical deposition is followed by another thermal treatment (block 106B). After the $Ta_2O_5$ formation is completed, a wide band gap material layer 86 made of $La_2O_3$ is deposited using atomic layer deposition (block 108C) The semiconductive cathode 88 made of PEDOT may then be deposited (as generally described above with respect to block 110 of method 130 in FIG. 15). In particular, PEDOT is polymerized in-situ (block 110A), followed by deposition of pre-polymerized PEDOT:PSS slurry (block 110B).

Figure 20:
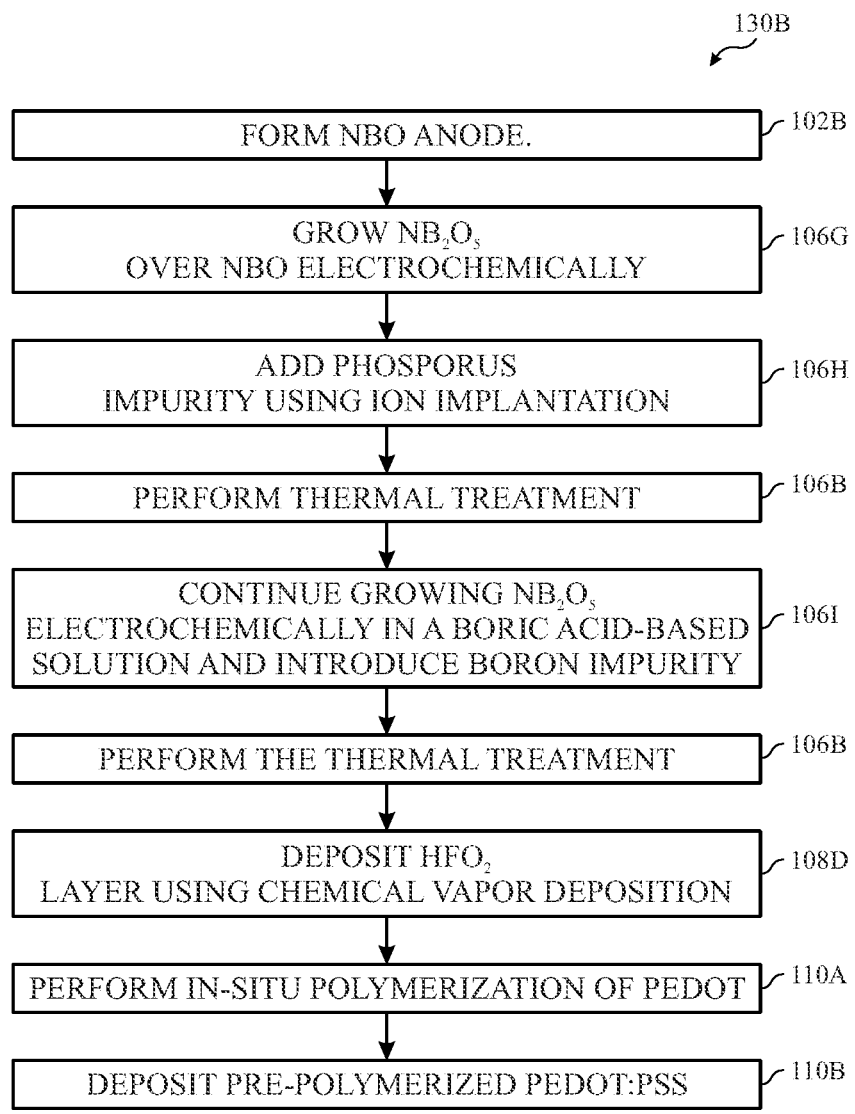
FIG. 20 is a flowchart of a method for producing a niobium monoxide-based polymer capacitor with charge depletion region in the insulator/dielectric and a wide band gap hafnium oxide (HfO$_2$) layer, in accordance with an embodiment of the present disclosure.

FIG. 20 is a flowchart of a method 130B for producing a niobium monoxide-based polymer capacitor (a specific embodiment of a polymer capacitor 60C) with charge depletion region 89 formed from phosphorus (P) and boron (B) impurities in the insulator/dielectric 84 and a wide band gap $HfO_2$ layer 86, in accordance with an embodiment. The method 130B includes using a niobium monoxide (NbO) pellet as the conductive anode 82 (block 102B). Next, $Nb_2O_5$ insulator/dielectric 84 is grown over NbO in a multistep process (e.g., a specific example of block 106 as discussed above with respect to method 130 of FIG. 15). In particular, $Nb_2O_5$ is deposited over NbO using electrochemical deposition (e.g., electrochemical anodization) (block 106G). The phosphorus impurity 92 is then added using ion implantation (block 106H) followed by a thermal treatment (block 106B). $Nb_2O_5$ growth is continued in a boric acid-based solution using electrochemical deposition and a boron impurity 94 is introduced (block 106I). The electrochemical deposition is followed by a thermal treatment (block 106B). After the $Nb_2O_5$ formation is completed, a wide band gap material layer 86 made of $HfO_2$ is deposited using chemical vapor deposition (e.g., ALD, MOCVD, or the like) (block 108D). The semiconductive cathode 88 made of PEDOT may then be deposited (as generally described above with respect to block 110 of method 130 in FIG. 15). In particular, PEDOT is polymerized in-situ (block 110A), followed by deposition of pre-polymerized PEDOT:PSS slurry (block 110B).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A capacitor, comprising:
a conductive anode;
a dielectric layer disposed on the conductive anode;
a wide band gap layer disposed on the dielectric layer;
a semiconductive cathode disposed on the wide band gap layer;
an electron acceptor doping impurity of a charge depletion region of the dielectric layer;
an electron donor doping impurity of the charge depletion region; and
an undoped portion of the dielectric layer disposed between the electron acceptor doping impurity and the electron donor doping impurity.

2. The capacitor of claim 1, wherein:
the conductive anode comprises tantalum (Ta), niobium (Nb), aluminum (Al), or niobium monoxide (NbO), or any combination thereof; and
the dielectric layer comprises tantalum pentoxide ($Ta_2O_5$), niobium pentoxide ($Nb_2O_5$), or aluminum(III) oxide ($Al_2O_3$), or any combination thereof.

3. The capacitor of claim 1,
wherein the electron donor doping impurity is disposed between the electron acceptor doping impurity and the conductive anode.

4. The capacitor of claim 1, wherein an energy difference between a lowest energy in a conduction band of the wide band gap layer and a highest energy in a valence band of the wide band gap layer is greater than an energy difference between a lowest energy in a conduction band of the dielectric layer and a highest energy in a valence band of the dielectric layer.

5. The capacitor of claim 1, wherein an amount of energy used to promote an electron from a highest occupied molecular orbital in the wide band gap layer to a lowest unoccupied molecular orbital in the wide band gap layer is greater than an amount of energy used to promote an electron from a highest energy in a valence band in the dielectric layer to a lowest energy in a conduction band in the dielectric layer.

6. The capacitor of claim 1, wherein the wide band gap layer comprises silicon nitride (Si3N4), silicon dioxide (SiO2), zirconium dioxide (ZrO2), hafnium oxide (HfO2), lanthanum(III) oxide (La2O3), yttrium oxide (Y2O3), polyethylene, or polypropylene, or any combination thereof.

7. The capacitor of claim 1, wherein the semiconductive cathode comprises poly (3,4-ethylenedioxythiophene) (PEDOT), poly (3,4-ethylenedioxythiophene) polystyrene sulfonate (PEDOT:PSS), or polypyrrole (PPy), or any combination thereof.

8. A capacitor comprising:
a conductive anode;
an insulator layer disposed on the conductive anode, the insulator layer having a charge depletion region formed therein;
an electron acceptor doping impurity of the charge depletion region;
an electron donor doping impurity of the charge depletion region, wherein the electron donor doping impurity is disposed between the electron acceptor doping impurity and the conductive anode; and
a semiconductive cathode disposed on the insulator layer.

9. The capacitor of claim 8, wherein the electron donor doping impurity comprises phosphorus (P), arsenic (As), or antimony (Sb), or any combination thereof.

10. The capacitor of claim 8, wherein the electron acceptor doping impurity comprises boron (B), or gallium (Ga), or both.

11. The capacitor of claim 8, wherein the semiconductive cathode is comprised of a semiconductive polymer, and the conductive anode is comprised of a conductive material.

12. The capacitor of claim 8, wherein the insulator layer is comprised of an oxide of a conductive material found in the conductive anode.

13. The capacitor of claim 8, wherein:
the electron donor doping impurity comprises elements or compounds from Group 15 of a periodic table of elements; and the electron acceptor doping impurity comprises elements or compounds from Group 13 of the periodic table of elements.

14. A capacitor, comprising:
a conductive anode;
a dielectric layer formed on the conductive anode, the dielectric layer having a charge depletion region formed therein;
an electron acceptor doping impurity of the charge depletion region;
an electron donor doping impurity of the charge depletion region, wherein the electron donor doping impurity is disposed between the electron acceptor doping impurity and the conductive anode;
a wide band gap layer deposited on the dielectric layer and configured to decrease an anomalous charging current in the capacitor; and
a semiconductive cathode.

15. The capacitor of claim 14, wherein an energy difference between a lowest energy in a conduction band of the wide band gap layer and a highest energy in a valence band of the wide band gap layer is greater than an energy difference between a lowest energy in a conduction band of the dielectric layer and a highest energy in a valence band of the dielectric layer.

16. The capacitor of claim 14, wherein an amount of energy used to promote an electron from a highest occupied molecular orbital in the wide band gap layer to a lowest unoccupied molecular orbital in the wide band gap layer is greater than an amount of energy used to promote an electron from a highest energy in a valence band in the dielectric layer to a lowest energy in a conduction band in the dielectric layer.

17. The capacitor of claim 14, wherein:
the electron donor doping impurity comprises elements or compounds from Group 15 of a periodic table of elements; and
the electron acceptor doping impurity comprises elements or compounds from Group 13 of the periodic table of elements.

18. The capacitor of claim 14, wherein the charge depletion region is configured to decrease the anomalous charging current in the capacitor by reducing a bulk-limited current within the dielectric layer associated with oxygen and metal vacancies.

19. The capacitor of claim 14, wherein the wide band gap layer is configured to decrease the anomalous charging current in the capacitor by increasing an energy barrier between the semiconductive cathode and the dielectric layer.

20. A capacitor, comprising:
a conductive anode;
a dielectric layer disposed on the conductive anode;
a wide band gap layer disposed on the dielectric layer;
a semiconductive cathode disposed on the wide band gap layer;
an electron acceptor doping impurity of a charge depletion region of the dielectric layer; and
an electron donor doping impurity of the charge depletion region, wherein the electron donor doping impurity is disposed between the electron acceptor doping impurity and the conductive anode.

* * * * *